United States Patent
Kamijo et al.

(10) Patent No.: US 7,062,916 B2
(45) Date of Patent: Jun. 20, 2006

(54) POWER OUTPUT APPARATUS AND CONTROL METHOD OF THE SAME

(75) Inventors: Yusuke Kamijo, Hermosa beach, CA (US); Kiyoshiro Ueoka, Nisshin (JP); Norihiro Iwase, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/125,123

(22) Filed: May 10, 2005

(65) Prior Publication Data

US 2005/0266957 A1    Dec. 1, 2005

(30) Foreign Application Priority Data

May 11, 2004 (JP) .............................. 2004-141299
Sep. 10, 2004 (JP) .............................. 2004-263387

(51) Int. Cl.
*F01B 21/04* (2006.01)

(52) U.S. Cl. .......................................... 60/706; 60/716

(58) Field of Classification Search .................. 60/706, 60/711, 716; 180/65.2, 65.3, 65.4
See application file for complete search history.

(56) References Cited

U.S. PATENT DOCUMENTS

| | | | | |
|---|---|---|---|---|
| 4,438,342 A | * | 3/1984 | Kenyon | 290/45 |
| 5,346,031 A | * | 9/1994 | Gardner | 180/179 |
| 5,495,906 A | * | 3/1996 | Furutani | 180/65.2 |
| 5,967,940 A | * | 10/1999 | Yamaguchi | 477/107 |
| 6,389,348 B1 | * | 5/2002 | Takagi et al. | 701/58 |
| 6,962,224 B1 | * | 11/2005 | Nakanowatari | 180/65.2 |

FOREIGN PATENT DOCUMENTS

| | | |
|---|---|---|
| JP | 63-314346 | 12/1988 |
| JP | 2002-186108 | 6/2002 |
| JP | 2005 307874 A | 11/2005 |

* cited by examiner

*Primary Examiner*—Hoang Nguyen
(74) *Attorney, Agent, or Firm*—Kenyon & Kenyon LLP

(57) ABSTRACT

When an actual output power level of an engine is greater than a preset engine power demand due to the higher density of intake air in a cold environment, the control procedure of the invention controls a motor to raise a rotation speed of the engine with a throttle opening TH kept at a current level, so as to make the actual output power level of the engine substantially equal to the engine power demand (this is attained by, for example, a change of a target drive point from a point A to a point B). This arrangement effectively restrains a battery from being charged with an unexpectedly large electric power and prevents frequent changeover between the stop and the start of the engine with a significant variation in current state of charge (SOC) of the battery.

19 Claims, 11 Drawing Sheets

POWER OUTPUT APPARATUS AND CONTROL METHOD OF THE SAME

BACKGROUND OF THE INVENTION

1. Field of the Invention

The present invention relates to a power output apparatus and a control method of the power output apparatus.

2. Description of the Prior Art

One proposed power output apparatus is mounted on a vehicle having a transmission to convert output powers from an engine and a motor and executes feedback control of the rotation speed of the motor corresponding to a difference between an actual rotation speed and a preset target rotation speed of the engine for the smooth engine idling (see, for example, Japanese Patent Laid-Open Gazette No. 2002-186108). This prior art power output apparatus executes feedback control of the rotation speed of the motor based on the difference between the actual rotation speed and the target rotation speed of the engine to enhance the stability of engine idling.

SUMMARY OF THE INVENTION

In the power output apparatus, the motor utilizes the output power of the engine and generates electric power, which is used to charge a battery. In a cold environment, there may be frequent changeover between the stop of the engine to prevent overcharge of the battery and the start of the engine to charge the battery. The higher density of the intake air in the cold environment causes the engine to output a higher torque than an expected level and charges the battery with an unexpectedly large electric power. The engine is thus stopped to prevent such overcharge of the battery. During the stop of the engine, a charge demand of the battery is given to drive both auxiliary machines of the power output apparatus and auxiliary machinery of the whole vehicle, which receive supplies of electric power from the battery. The engine is accordingly started to charge the battery. This leads to frequent changeover between the stop and the start of the engine. This frequent changeover is also observed in the course of outputting the power of the engine to a drive shaft.

The power output apparatus of the invention, the motor vehicle equipped with the power output apparatus, and the control method of the power output apparatus thus aim to prevent frequent changeover between the stop and the start of an internal combustion engine in a cold environment. The power output apparatus of the invention, the motor vehicle equipped with the power output apparatus, and the control method of the power output apparatus also aim to ensure output of a required level of power to a drive shaft even in a cold environment.

In order to attain at least part of the above aims, the present invention is constructed as follows.

The present invention is directed to a first power output apparatus that outputs power to a drive shaft and includes: an internal combustion engine; an electric power-mechanical power input-output module that is linked to an output shaft of the internal combustion engine and to the drive shaft and outputs at least part of output power of the internal combustion engine to the drive shaft through input and output of electric powers and mechanical powers; an accumulator module that receives and gives electric powers from and to the electric power-mechanical power input-output module; and a control module that specifies a power demand to be output to the drive shaft and sets a target power to be output from the internal combustion engine in response to the specified power demand and a target drive point to attain the output of the target power. In an ordinary state, the control module in the power output apparatus executes ordinary control of the internal combustion engine and the electric power-mechanical power input-output module to drive the internal combustion engine at the target drive point and to ensure output of a required power corresponding to the power demand to the drive shaft. In a non-ordinary state where execution of the ordinary control causes an output power level of the internal combustion engine to exceed the target power, on the other hand, the control module in the power output apparatus executes non-ordinary control of the internal combustion engine and the electric power-mechanical power input-output module to drive the internal combustion engine at a specific drive point of making the output power level of the internal combustion engine approach to the target power, while keeping a level of a throttle opening at the target drive point, and to ensure the output of the required power corresponding to the power demand to the drive shaft.

In the first power output apparatus of the invention, the ordinary control of the internal combustion engine and the electric power-mechanical power input-output module, which outputs at least part of the output power of the internal combustion engine to the drive shaft through input and output of electric powers and mechanical powers, is executed in the ordinary state to drive the internal combustion engine at the target drive point, which is set in response to the power demand to be output to the drive shaft, and to ensure output of the required power corresponding to the power demand to the drive shaft. In the non-ordinary state where execution of the ordinary control causes the output power level of the internal combustion engine to exceed the target power, which is set in response to the power demand to be output to the drive shaft, the non-ordinary control of the internal combustion engine and the electric power-mechanical power input-output module is executed to drive the internal combustion engine at the specific drive point of making the output power level of the internal combustion engine approach to the target power, while keeping the level of the throttle opening at the target drive point, and to ensure the output of the required power corresponding to the power demand to the drive shaft. Such control effectively restricts an increase in electric power for charging the accumulator module, due to an increase in output power level of the internal combustion engine above the target power. The first power output apparatus of the invention thus desirably prevents frequent changeover between the stop of the internal combustion engine to prevent overcharge of the accumulator module and the start of the internal combustion engine to charge the accumulator module in response to a requirement for activation of auxiliary machinery, while ensuring output of a required level of power corresponding to the power demand to the drive shaft.

In the first power output apparatus of the invention, the control module may execute the non-ordinary control in the non-ordinary state to drive the internal combustion engine at a specific drive point of making the output power level of the internal combustion engine substantially equal to the target power.

In the first power output apparatus of the invention, the control module may set an input limit of the accumulator module and execute the non-ordinary control in the non-ordinary state to set a drive point of the internal combustion engine for making the output power level of the internal combustion engine approach to the target power within a range of the input limit of the accumulator module and to drive the internal combustion engine at the set drive point.

In the first power output apparatus of the invention, the control module may execute the non-ordinary control in the non-ordinary state to vary at least one of driving parameters, which represent operating conditions of the internal combustion engine and include a rotation speed, a torque level, an ignition timing, and intake and exhaust timings, and accordingly make the output power level of the internal combustion engine approach to the target power. In this case, as one structure, the control module may heighten the rotation speed in the non-ordinary state than a level in the ordinary state and thereby make the output power level of the internal combustion engine approach to the target power. As another structure, the internal combustion engine included in the power output apparatus may have an ignition timing adjustment module that adjusts the ignition timing of the internal combustion engine, and the control module may give a lag to the ignition timing of the internal combustion engine in the non-ordinary state and thereby make the output power level of the internal combustion engine approach to the target power. As still another structure, the internal combustion engine may have an intake timing regulation module that regulates the intake timing into the internal combustion engine, and the control module may give a lag to the intake timing in the non-ordinary state and thereby make the output power level of the internal combustion engine approach to the target power.

In the first power output apparatus of the invention, the control module may specify a target charge-discharge power to charge the accumulator module or to be discharged from the accumulator module and set the target power based on the specified target charge-discharge power.

In one embodiment, the first power output apparatus of the invention further includes a motor that is capable of outputting power to the drive shaft. The control module controls the internal combustion engine, the electric power-mechanical power input-output module, and the motor to ensure the output of the required power corresponding to the power demand to the drive shaft. In this embodiment, as one structure, the electric power-mechanical power input-output module may includes a three shaft-type power input-output unit that has three shafts, that is, the output shaft of the internal combustion engine, the drive shaft, and a rotating shaft, and determines a power input from and output to a residual shaft based on powers input from and output to any two shafts among the three shafts, and a motor that is capable of inputting and outputting power from and to the rotating shaft. In the above embodiment, as another structure, the electric power-mechanical power input-output module may include a pair-rotor motor that has a first rotor connected to the output shaft of the internal combustion engine and a second rotor connected to the drive shaft, where the first rotor rotates relative to the second rotor.

The present invention is also directed to a second power output apparatus that outputs power to a drive shaft and includes:

an internal combustion engine; an electric power-mechanical power input-output module that is linked to an output shaft of the internal combustion engine and to the drive shaft and outputs at least part of output power of the internal combustion engine to the drive shaft through input and output of electric powers and mechanical powers; an accumulator module that receives and gives electric powers from and to the electric power-mechanical power input-output module; and a control module that specifies a power demand to be output to the drive shaft and sets a target power to be output from the internal combustion engine in response to the specified power demand and a target drive point to attain the output of the target power. In an ordinary state, the control module in the power output apparatus executes ordinary control of the internal combustion engine and the electric power-mechanical power input-output module to drive the internal combustion engine at the target drive point and to ensure output of a required power corresponding to the power demand to the drive shaft. In a non-ordinary state where execution of the ordinary control causes an output power level of the internal combustion engine to exceed the target power, on the other hand, the control module executes non-ordinary control of the internal combustion engine and the electric power-mechanical power input-output module to keep a selected driving parameter among multiple driving parameters, which represent operating conditions of the internal combustion engine and include a rotation speed, a torque level, an ignition timing, intake and exhaust timings, and a throttle opening, at a current level, while varying at least one driving parameter other than the selected driving parameter, thus driving the internal combustion engine at a specific drive point of making the output power level of the internal combustion engine approach to the target power and ensuring the output of the required power corresponding to the power demand to the drive shaft.

In the second power output apparatus of the invention, the ordinary control of the internal combustion engine and the electric power-mechanical power input-output module, which outputs at least part of the output power of the internal combustion engine to the drive shaft through input and output of electric powers and mechanical powers, is executed in the ordinary state to drive the internal combustion engine at the target drive point, which is set in response to the power demand to be output to the drive shaft, and to ensure output of the required power corresponding to the power demand to the drive shaft. In the non-ordinary state where execution of the ordinary control causes the output power level of the internal combustion engine to exceed the target power, which is set in response to the power demand to be output to the drive shaft, the non-ordinary control of the internal combustion engine and the electric power-mechanical power input-output module is executed to keep a selected driving parameter among multiple driving parameters, which represent operating conditions of the internal combustion engine and include a rotation speed, a torque level, an ignition timing, intake and exhaust timings, and a throttle opening, at a current level, while varying at least one driving parameter other than the selected driving parameter, thus driving the internal combustion engine at a specific drive point of making the output power level of the internal combustion engine approach to the target power and ensuring the output of the required power corresponding to the power demand to the drive shaft. Such control effectively restricts an increase in electric power for charging the accumulator module, due to an increase in output power level of the internal combustion engine above the target power. The second power output apparatus of the invention thus desirably prevents frequent changeover between the stop of the internal combustion engine to prevent overcharge of the accumulator module and the start of the internal combustion engine to charge the accumulator module in response to a requirement for activation of auxiliary machinery, while ensuring output of a required level of power corresponding to the power demand to the drive shaft.

The present invention is further directed to a first control method of a power output apparatus which includes an internal combustion engine, an electric power-mechanical power input-output module that is linked to an output shaft of the internal combustion engine and to a drive shaft and outputs at least part of output power of the internal combustion engine to the drive shaft through input and output of electric powers and mechanical powers, and an accumulator module that receives and gives electric powers from and to the electric power-mechanical power input-output module. The first control method includes the steps of: (a) specifying a power demand to be output to the drive shaft; (b) setting a target power to be output from the internal combustion engine in response to the specified power demand and a target drive point to attain the output of the target power; and (c) in an ordinary state, executing ordinary control of the internal combustion engine and the electric power-mechanical power input-output module to drive the internal combustion engine at the target drive point and to ensure output of a required power corresponding to the power demand to the drive shaft, while in a non-ordinary state where execution of the ordinary control causes an output power level of the internal combustion engine to exceed the target power, executing non-ordinary control of the internal combustion engine and the electric power-mechanical power input-output module to drive the internal combustion engine at a specific drive point of making the output power level of the internal combustion engine approach to the target power, while keeping a level of a throttle opening at the target drive point, and to ensure the output of the required power corresponding to the power demand to the drive shaft.

In the first control method of the invention, the ordinary control of the internal combustion engine and the electric power-mechanical power input-output module, which outputs at least part of the output power of the internal combustion engine to the drive shaft through input and output of electric powers and mechanical powers, is executed in the ordinary state to drive the internal combustion engine at the target drive point, which is set in response to the power demand to be output to the drive shaft, and to ensure output of the required power corresponding to the power demand to the drive shaft. In the non-ordinary state where execution of the ordinary control causes the output power level of the internal combustion engine to exceed the target power, which is set in response to the power demand to be output to the drive shaft, the non-ordinary control of the internal combustion engine and the electric power-mechanical power input-output module is executed to drive the internal combustion engine at the specific drive point of making the output power level of the internal combustion engine approach to the target power, while keeping the level of the throttle opening at the target drive point, and to ensure the output of the required power corresponding to the power demand to the drive shaft. Such control effectively restricts an increase in electric power for charging the accumulator module, due to an increase in output power level of the internal combustion engine above the target power. The first control method of the invention thus desirably prevents frequent changeover between the stop of the internal combustion engine to prevent overcharge of the accumulator module and the start of the internal combustion engine to charge the accumulator module in response to a requirement for activation of auxiliary machinery, while ensuring output of a required level of power corresponding to the power demand to the drive shaft.

In the first control method of the invention, the step(c) may execute the non-ordinary control in the non-ordinary state to drive the internal combustion engine at a specific drive point of making the output power level of the internal combustion engine substantially equal to the target power. The step(c) may set an input limit of the accumulator module and execute the non-ordinary control in the non-ordinary state to set a drive point of the internal combustion engine for making the output power level of the internal combustion engine approach to the target power within a range of the input limit of the accumulator module and to drive the internal combustion engine at the set drive point. The step(c) may execute the non-ordinary control in the non-ordinary state to vary at least one of driving parameters, which represent operating conditions of the internal combustion engine and include a rotation speed, a torque level, an ignition timing, and intake and exhaust timings, and accordingly make the output power level of the internal combustion engine approach to the target power. The step(c) may specify a target charge-discharge power to charge the accumulator module or to be discharged from the accumulator module and set the target power based on the specified target charge-discharge power.

In one embodiment of the first control method of the invention, the power output apparatus further includes a motor that is capable of outputting power to the drive shaft, and the step(c) controls the internal combustion engine, the electric power-mechanical power input-output module, and the motor to ensure the output of the required power corresponding to the power demand to the drive shaft.

The present invention is further directed to a second power output apparatus which includes an internal combustion engine, an electric power-mechanical power input-output module that is linked to an output shaft of the internal combustion engine and to a drive shaft and outputs at least part of output power of the internal combustion engine to the drive shaft through input and output of electric powers and mechanical powers, and an accumulator module that receives and gives electric powers from and to the electric power-mechanical power input-output module. The second control method includes the steps of: (a) specifying a power demand to be output to the drive shaft; (b) setting a target power to be output from the internal combustion engine in response to the specified power demand and a target drive point to attain the output of the target power; and (c) in an ordinary state, executing ordinary control of the internal combustion engine and the electric power-mechanical power input-output module to drive the internal combustion engine at the target drive point and to ensure output of a required power corresponding to the power demand to the drive shaft, while in a non-ordinary state where execution of the ordinary control causes an output power level of the internal combustion engine to exceed the target power, executing non-ordinary control of the internal combustion engine and the electric power-mechanical power input-output module to keep a selected driving parameter among multiple driving parameters, which represent operating conditions of the internal combustion engine and include a rotation speed, a torque level, an ignition timing, intake and exhaust timings, and a throttle opening, at a current level, while varying at least one driving parameter other than the selected driving parameter, thus driving the internal combustion engine at a specific drive point of making the output power level of the internal combustion engine approach to the target power and ensuring the output of the required power corresponding to the power demand to the drive shaft.

In the second control method, the ordinary control of the internal combustion engine and the electric power-mechanical power input-output module, which outputs at least part of the output power of the internal combustion engine to the drive shaft through input and output of electric powers and mechanical powers, is executed in the ordinary state to drive the internal combustion engine at the target drive point, which is set in response to the power demand to be output to the drive shaft, and to ensure output of the required power corresponding to the power demand to the drive shaft. In the non-ordinary state where execution of the ordinary control causes the output power level of the internal combustion engine to exceed the target power, which is set in response to the power demand to be output to the drive shaft, the non-ordinary control of the internal combustion engine and the electric power-mechanical power input-output module is executed to keep a selected driving parameter among multiple driving parameters, which represent operating conditions of the internal combustion engine and include a rotation speed, a torque level, an ignition timing, intake and exhaust timings, and a throttle opening, at a current level, while varying at least one driving parameter other than the selected driving parameter, thus driving the internal combustion engine at a specific drive point of making the output power level of the internal combustion engine approach to the target power and ensuring the output of the required power corresponding to the power demand to the drive shaft. Such control effectively restricts an increase in electric power for charging the accumulator module, due to an increase in output power level of the internal combustion engine above the target power. The second control method of the invention thus desirably prevents frequent changeover between the stop of the internal combustion engine to prevent overcharge of the accumulator module and the start of the internal combustion engine to charge the accumulator module in response to a requirement for activation of auxiliary machinery, while ensuring output of a required level of power corresponding to the power demand to the drive shaft.

DESCRIPTION OF THE PREFERRED EMBODIMENTS

Figure 1:
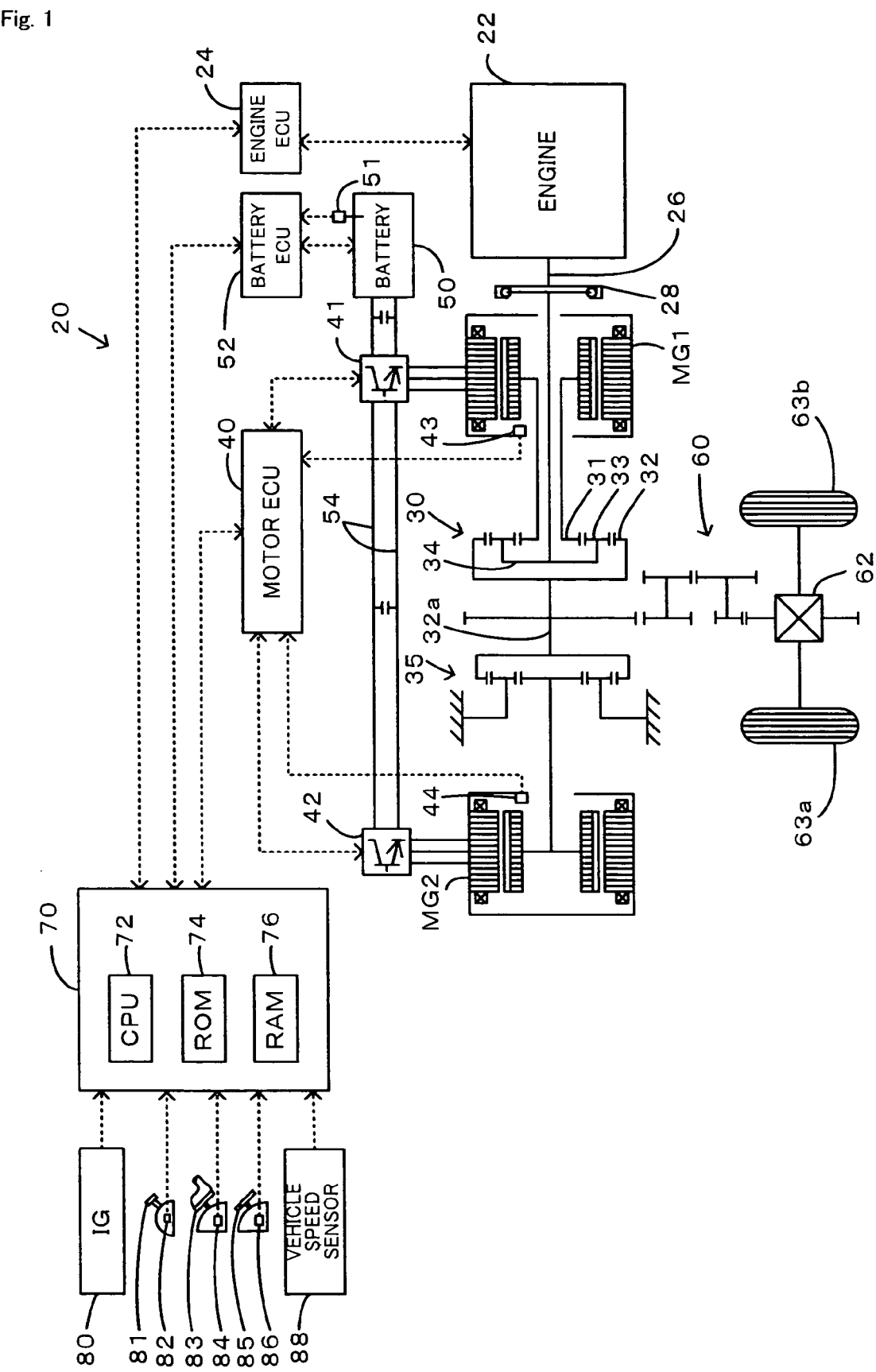
FIG. 1 schematically illustrates the construction of a hybrid vehicle 20 with a power output apparatus mounted thereon in the first embodiment of the invention.

Some modes of carrying out the invention is discussed below as a preferred embodiment. FIG. 1 schematically illustrates the construction of a hybrid vehicle 20 with a power output apparatus mounted thereon in the first embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole power output apparatus.

Figure 2:
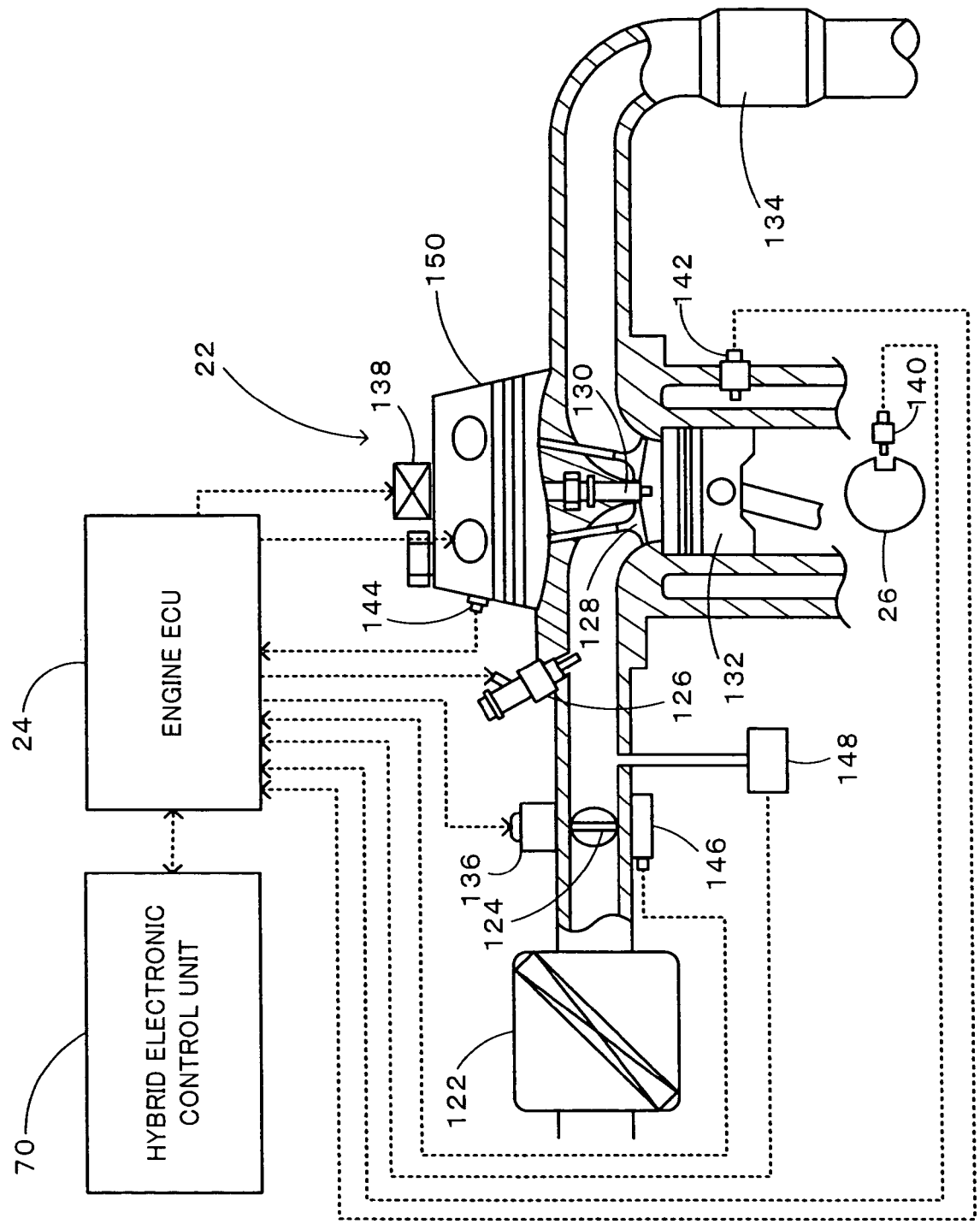
FIG. 2 schematically illustrates the configuration of an engine 22.

The engine 22 is an internal combustion engine that consumes a hydrocarbon fuel, such as gasoline or light oil, to output power. As shown in FIG. 2, the engine 22 receives a supply of the air cleaned by an air cleaner 122 and ingested via a throttle valve 124, while receiving a supply of gasoline injected by a fuel injection valve 126. The supplies of the air and gasoline are mixed to an air-fuel mixture, which is introduced into a combustion chamber via an intake valve 128 and is ignited for explosive combustion with an electric spark of an ignition plug 130. Reciprocating motions of a piston 132 by means of energy of the explosive combustion are converted into rotations of the crankshaft 26. The exhaust gas from the engine 22 goes through a catalytic converter (three-way catalyst) 134 for removal of toxic components contained in the exhaust gas, that is, carbon monoxide (CO), hydrocarbons (HC), and nitrogen oxides (NOx), and is discharged to the outside air.

The engine 22 is under control of an engine electronic control unit (hereafter referred to as engine ECU) 24. The engine ECU 24 inputs signals representing the present conditions of the engine 22 from various sensors via its input port (not shown). For example, the engine ECU 24 receives, via its input port, a crank position or a rotational position of the crankshaft 26 from a crank position sensor 140, a cooling water temperature of the engine 22 from a water temperature sensor 142, a cam position or a rotational position of a cam shaft, which opens and closes the intake valve 128 and an exhaust valve for gas intake and exhaust into and from the combustion chamber, from a cam position sensor 144, a throttle position or a position of the throttle valve 124 from a throttle valve position sensor 146, and an air intake flow as a load of the engine 22 from a vacuum sensor 148. The engine ECU 24 outputs diversity of drive signals and control signals to drive and control the engine 22 via its output port (not shown). For example, the engine ECU 24 outputs, via its output port, drive signals to the fuel injection valve 126 and to a throttle motor 136 for regulating the position of the throttle valve 124 and control signals to an ignition coil 138 integrated with an igniter and to a variable valve timing mechanism 150 for varying the open and close timings of the intake valve 128. The engine ECU 24 establishes communication with the hybrid electronic control unit 70 and receives control signals from the hybrid electronic control unit 70 to drive and control the engine 22, while outputting data regarding the driving conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via the ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is finally transmitted to the driving wheels 63a, 63b via the gear mechanism 60 and differential gear 62 from ring gear shaft 32a.

Both of the motors MG1 and MG2 are constructed as known synchronous generator motors, which are driven as an electric generator as well as an electric motor. The motors MG1 and MG2 transmit electric power from and to a battery 50 via inverters 41 and 42. A power line 54 connecting the inverters 41 and 42 with the battery 50 includes a positive terminal bus line and a negative terminal bus line shared by the two inverters 41 and 42. This arrangement enables the electric power generated by one of the motors MG1 and MG2 to be consumed by the other motor. The battery 50 is charged with the excess electric power of the motor MG1 or the motor MG2 and is discharged to supplement the insufficient electric power of the motor MG1 or the motor MG2. The battery 50 is neither charged not discharged when there is an electric power balance by the motors MG1 and MG2. The motors MG1 and MG2 are both driven and controlled by a motor electronic control unit (hereinafter referred to as motor ECU) 40. The motor ECU 40 receives signals required for driving and controlling the motors MG1 and MG2, for example, signals from rotational position detection sensors 43 and 44 that detect the rotational positions of rotors in the motors MG1 and MG2 and values of phase electric currents supplied to the motors MG1 and MG2 and detected by non-illustrated electric current sensors. The motor ECU 40 outputs switching control signals to the inverters 41 and 42. The motor ECU 40 communicates with the hybrid electronic control unit 70 and drives and controls the motors MG1 and MG2 in response to control signals from the hybrid electronic control unit 70 while outputting data regarding the driving conditions of the motors MG1 and MG2 to the hybrid electronic control unit 70 according to the requirements.

Figure 3:
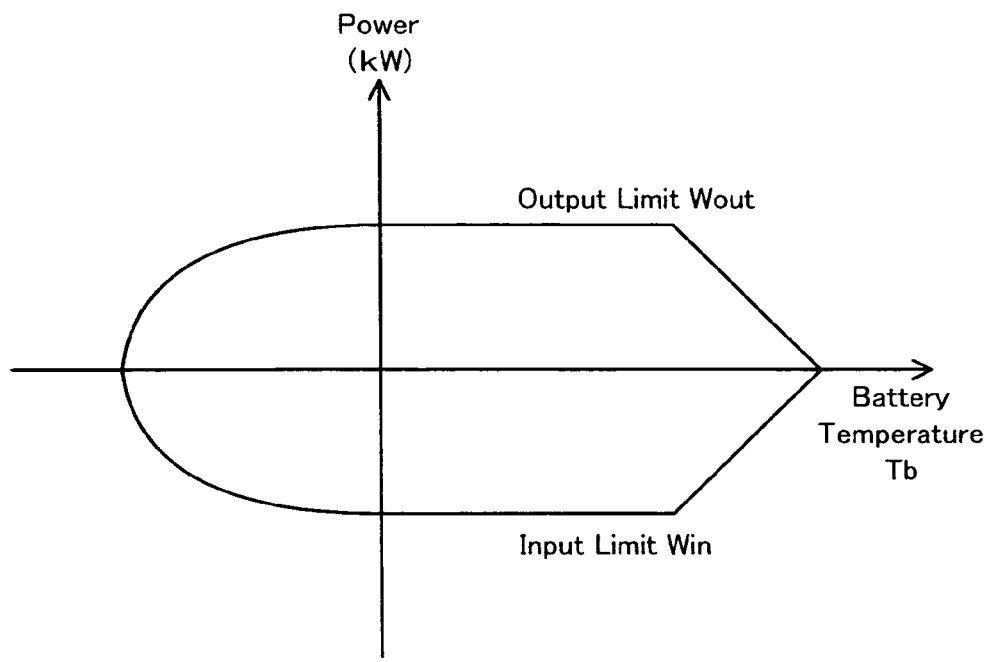
FIG. 3 shows variations in input limit Win and output limit Wout against battery temperature Tb of battery 50.
Figure 4:
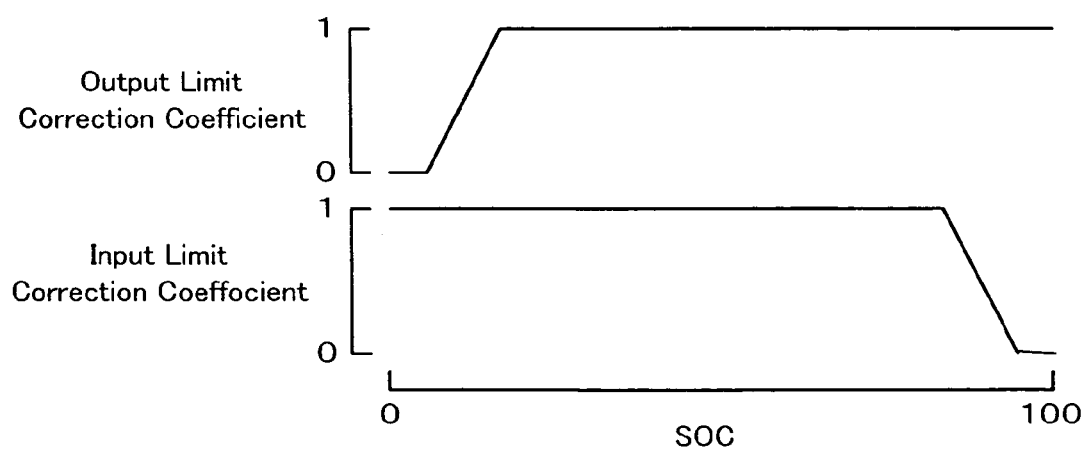
FIG. 4 shows variations in output limit correction coefficient and input limit correction coefficient against current state of charge (SOC) of the battery 50.

The battery 50 is charged with electric power supplied from the motors MG1 and MG2 and is discharged to supply electric power to the motors MG1 and MG2, while supplying electric power to auxiliary machinery mounted on the hybrid vehicle 20, for example, an air compressor included in air conditioning equipment of a passenger compartment. The battery 50 is under control of a battery electronic control unit (hereafter referred to as battery ECU) 52. The battery ECU 52 inputs signals required for management of the battery 50, for example, an inter-terminal voltage from a voltage sensor (not shown) located between terminals of the battery 50, a charge-discharge current from a current sensor (not shown) located in the power line 54 connecting with an output terminal of the battery 50, and a battery temperature Tb from a temperature sensor 51 attached to the battery 50. For the purpose of management of the battery 50, the battery ECU 52 calculates a charge-discharge power Pb as the product of the charge-discharge current measured by the current sensor and the inter-terminal voltage measured by the voltage sensor, computes a remaining charge level or current state of charge (SOC) of the battery 50 from an integration of the charge-discharge current measured by the current sensor, sets a charge-discharge power demand Pb* based on a difference between the current state of charge (SOC) and a target SOC, and sets an input limit Win and an output limit Wout of the battery 50 according to the battery temperature Tb of the battery 50 measured by the temperature sensor 51 and the current state of charge (SOC) of the battery 50. The control procedure of the first embodiment sets a higher charge power as the charge-discharge power demand Pb* with a decrease in current state of charge (SOC), which is not higher than subtraction of a preset threshold value S1 from the target SOC, while setting a higher discharge power as the charge-discharge power demand Pb* with an increase in current state of charge (SOC), which is not lower than a sum of a preset threshold value S2 and the target SOC. The control procedure of the first embodiment specifies reference values of the input limit Win and the output limit Wout corresponding to the measured battery temperature Tb, determines an input limit correction coefficient and an output limit correction coefficient corresponding to the current state of charge (SOC) of the battery 50, and multiplies the specified reference values of the input limit Win and the output limit Wout by the corresponding correction coefficients to set the input limit Win and the output limit Wout of the battery 50. FIG. 3 shows variations in input limit Win and output limit Wout against the battery temperature Tb. FIG. 4 shows variations in output limit correction coefficient and input limit correction coefficient against the current state of charge (SOC) of the battery 50. The battery ECU 52 sends such data measured, computed, and set for management of the battery 50 to the hybrid electronic control unit 70 by communication, according to the requirements.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a required torque, which is to be output to the ring gear shaft 32a or the drive shaft, based on the accelerator opening Acc corresponding to the driver's step-on amount of the accelerator pedal 83 and the vehicle speed V. The engine 22 and the motors MG1 and MG2 are under operation control to enable power corresponding to the calculated required torque to be actually output to the ring gear shaft 32a. The operation control of the engine 22 and the motors MG1 and MG2 has multiple modes, a torque conversion drive mode, a charge-discharge drive mode, and a motor drive mode. In the torque conversion drive mode, the engine 22 is under operation control to output a power equivalent to the required power. The motors MG1 and MG2 are driven and controlled to cause the total power output from the engine 22 to be subjected to the torque conversion by means of the power distribution and integration mechanism 30 and the motors MG1 and MG2 and to be output to the ring gear shaft 32a. In the charge-discharge drive mode, the engine 22 is under operation control to output a power equivalent to the sum of the required power and an electric power used for charging and discharging the battery 50. The motors MG1 and MG2 are driven and controlled to cause all or part of the power output from the engine 22 with a charge or a discharge of the battery 50 to be subjected to the torque conversion by means of the power distribution and integration mechanism 30 and the motors MG1 and MG2 and to be output as the required power to the ring gear shaft 32a. In the motor drive mode, the operation of the engine 22 is at a stop, while the motor MG2 is driven and controlled to output a power equivalent to the required power to the ring gear shaft 32a.

Figure 5:
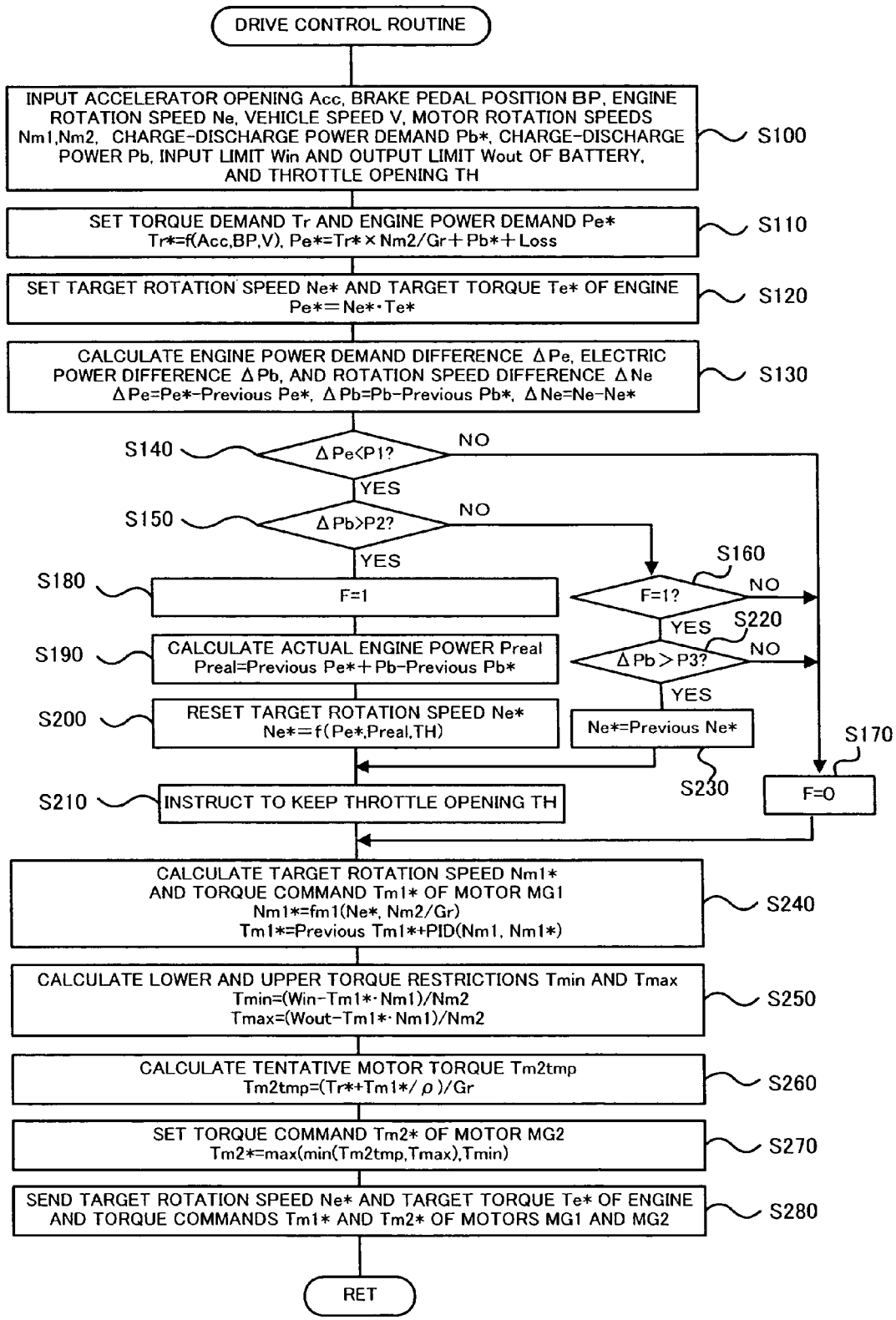
FIG. 5 is a flowchart showing a drive control routine executed by a hybrid electronic control unit 70 included in the hybrid vehicle 20.

The description now regards the operations of the hybrid vehicle 20 of the first embodiment constructed as discussed above, especially a series of cold control. FIG. 5 is a flowchart showing a drive control routine executed by the hybrid electronic control unit 70. This routine is carried out repeatedly at preset time intervals (for example, at every 8 msec).

In the drive control routine, the CPU 72 of the hybrid electronic control unit 70 first inputs various data required for control, that is, the accelerator opening Acc from the accelerator pedal position sensor 84, the brake pedal position BP from the brake pedal position sensor 86, a rotation speed Ne of the engine 22, the vehicle speed V from the vehicle speed sensor 88, rotation speeds Nm1 and Nm2 of the motors MG1 and MG2, the charge-discharge power demand Pb*, the charge-discharge power Pb, the input limit Win, and the output limit Wout of the battery 50, and a throttle opening TH (step S100). The rotation speed Ne of the engine 22 is computed from the crank position detected by the crank position sensor 140 attached to the crankshaft 26 and is received from the engine ECU 24 by communication. The rotation speeds Nm1 and Nm2 of the motors MG1 and MG2 are computed from the rotational positions of the rotors in the motors MG1 and MG2 detected by the rotational position detection sensors 43 and 44 and are received from the motor ECU 40 by communication. The charge-discharge power demand Pb*, the charge-discharge power Pb, the input limit Win, and the output limit Wout of the battery 50 are calculated and set and are received from the battery ECU 52 by communication.

Figure 6:
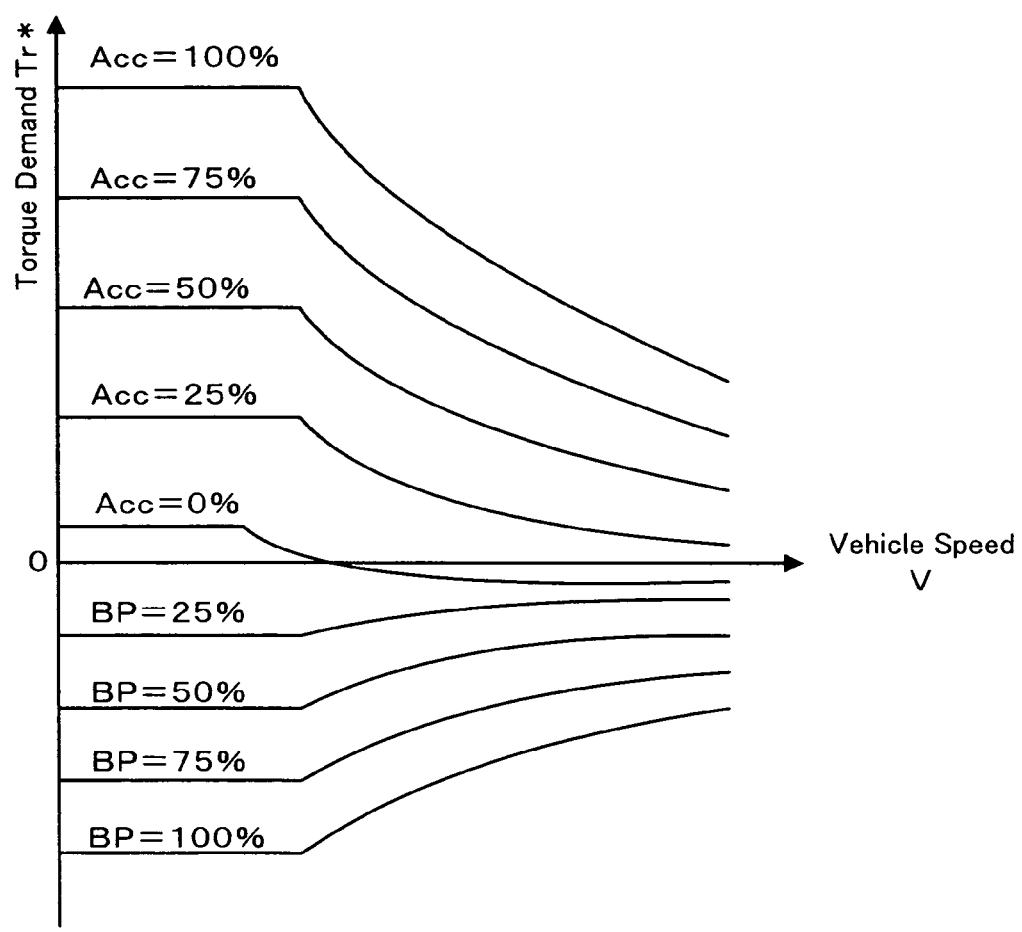
FIG. 6 shows an example of torque demand setting map.

After the data input, the CPU 72 sets a torque demand Tr* to be output to the ring gear shaft 32a or the drive shaft linked to the drive wheels 63a and 63b as the torque required for the vehicle and an engine power demand Pe* required for the engine 22, based on the input accelerator opening Acc, the input brake pedal position BP, and the input vehicle speed V (step S110). The control procedure of the first embodiment stores in advance variations in torque demand Tr* against the accelerator opening Acc, the brake pedal position BP, and the vehicle speed V as a torque demand setting map in the ROM 74 and reads the torque demand Tr* corresponding to the given accelerator opening Acc, the given brake pedal position BP, and the given vehicle speed V from the map. One example of the torque demand setting map is shown in FIG. 6. The engine power demand Pe* is calculated as the sum of the product of the torque demand Tr* and a rotation speed Nr of the ring gear shaft 32a or the drive shaft, the charge-discharge power demand Pb* of the battery 50, and a potential loss Loss. The rotation speed Nr of the ring gear shaft 32a is obtained by multiplying the vehicle speed V by a conversion coefficient k or by dividing the rotation speed Nm2 of the motor MG2 by a gear ratio Gr of the reduction gear 35.

Figure 7:
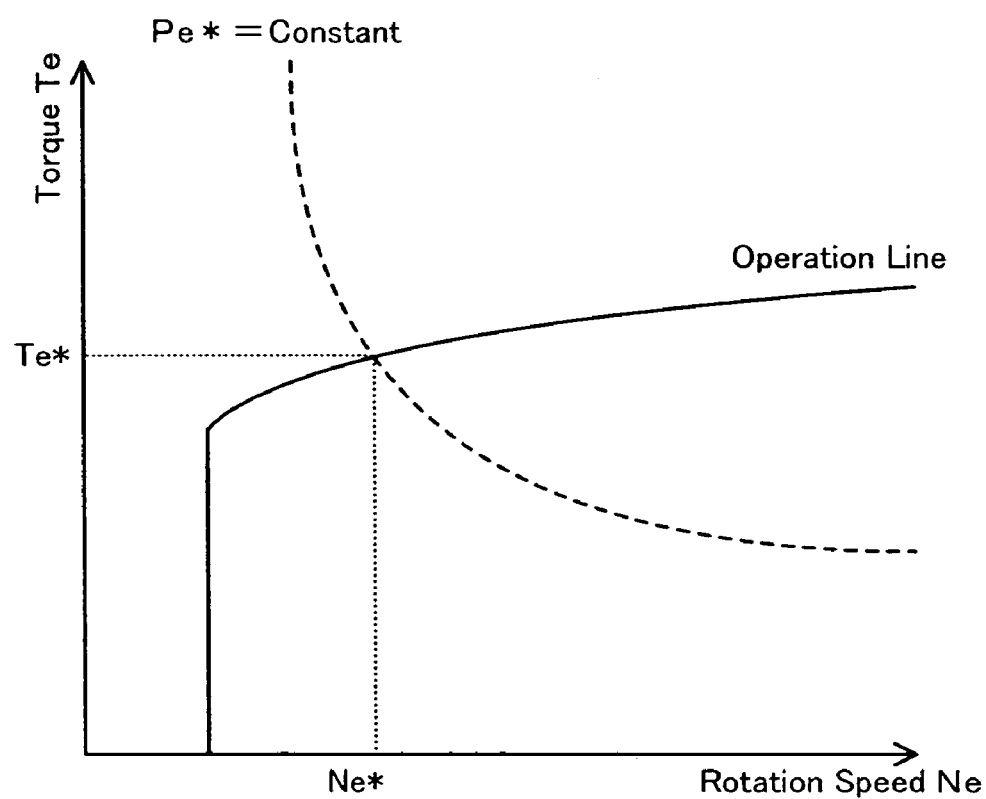
FIG. 7 shows an efficient operation line of the engine 22 to set target rotation speed Ne* and target torque Te*.

The CPU 72 subsequently sets a target rotation speed Ne* and a target torque Te* of the engine 22 corresponding to the engine power demand Pe* (step S120). The target rotation speed Ne* and the target torque Te* of the engine 22 are determined according to an efficient operation line of ensuring efficient operations of the engine 22 and the engine power demand Pe*. FIG. 7 shows an efficient operation line of the engine 22 to set the target rotation speed Ne* and the target torque Te*. The target rotation speed Ne* and the target torque Te* are given at an intersection of the efficient operation line and a constant power demand line of the engine power demand Pe* (=Ne*×Te*).

The CPU 72 then calculates an engine power demand difference $\Delta Pe$ between the current engine power demand Pe* set in the current cycle of this routine and a previous engine power demand Pe* set in a previous cycle of this routine, an electric power difference $\Delta Pb$ between the current charge-discharge power Pb of the battery 50 input in the current cycle of this routine and a previous charge-discharge power demand Pb* input in the previous cycle of this routine, and a rotation speed difference $\Delta Ne$ between the input rotation speed Ne and the target rotation speed Ne* of the engine 22 (step S130). The CPU 72 successively compares the calculated engine power demand difference $\Delta Pe$ with a preset threshold value P1 (step S140) and compares the calculated electric power difference $\Delta Pb$ with a preset threshold value P2 (step S150). The threshold value P1 is used as a criterion for detection of a significant change of the engine power demand Pe*. The threshold value P2 is used as a criterion for determining whether the charge-discharge power Pb of the battery 50 is within an allowable range from the charge-discharge power demand Pb*. A cold environment at low temperatures is a typical state where the electric power difference $\Delta Pb$ exceeds the allowable range from the charge-discharge power demand Pb*. Insufficient warm-up of the engine 22 in a cold environment causes intake of the higher-density air into the combustion chamber of the engine 22, simultaneously with injection of an increased fuel supply. The engine 22 accordingly outputs a greater power than the engine power demand Pe*. The torque demand Tr* is output to the ring gear shaft 32a or the drive shaft as described below, so that the excess power is used to charge the battery 50. This causes the electric power difference $\Delta Pb$ to exceed the allowable range from the charge-discharge power demand Pb*. The electric power difference $\Delta Pb$ thus represents a difference between the actual output of the engine 22 (actual engine power) Preal and the engine power demand Pe*. The comparison between the electric power difference $\Delta Pb$ and the preset threshold value P2 is accordingly equivalent to the determination of whether the actual engine power Preal is within an allowable range from the engine power demand Pe*.

The engine power demand difference ΔPe of not less than the preset threshold value P1 suggests a significant change of the engine power demand Pe*. There is accordingly no need of executing cold control discussed later to change the engine power demand Pe*. A cold control execution flag F is thus set equal to 0 (step S170). In response to the engine power demand difference ΔPe of less than the preset threshold value P1 and to the electric power difference ΔPb of not higher than the preset threshold value P2, the CPU 72 determines whether the cold control execution flag F is equal to 1 (step S160). In the case where the cold control execution flag F is equal to 0, the control flow goes to step S170. Under this condition, the processing of step S170 is actually not carried out since the cold control execution flag F has already been set equal to 0.

After setting the cold control execution flag F to 0, the CPU 72 calculates a target rotation speed Nm1* of the motor MG1 from the target rotation speed Ne* of the engine 22, the rotation speed Nr (=Nm2/Gr) of the ring gear shaft 32a, and a gear ratio ρ of the power distribution integration mechanism 30 according to Equation (1) given below, while calculating a torque command Tm1* of the motor MG1 from the calculated target rotation speed Nm1* and the current rotation speed Nm1 of the motor MG1 according to Equation (2) given below (step S240):

$$Nm1^* = Ne^* \cdot (1+\rho)/\rho - Nm2/(g \cdot \rho) \quad (1)$$

$$Tm1^* = \text{Previous } Tm1^* + k1(Nm1^* - Nm1) + k2\int(Nm1^* - Nm1)dt \quad (2)$$

Figure 8:
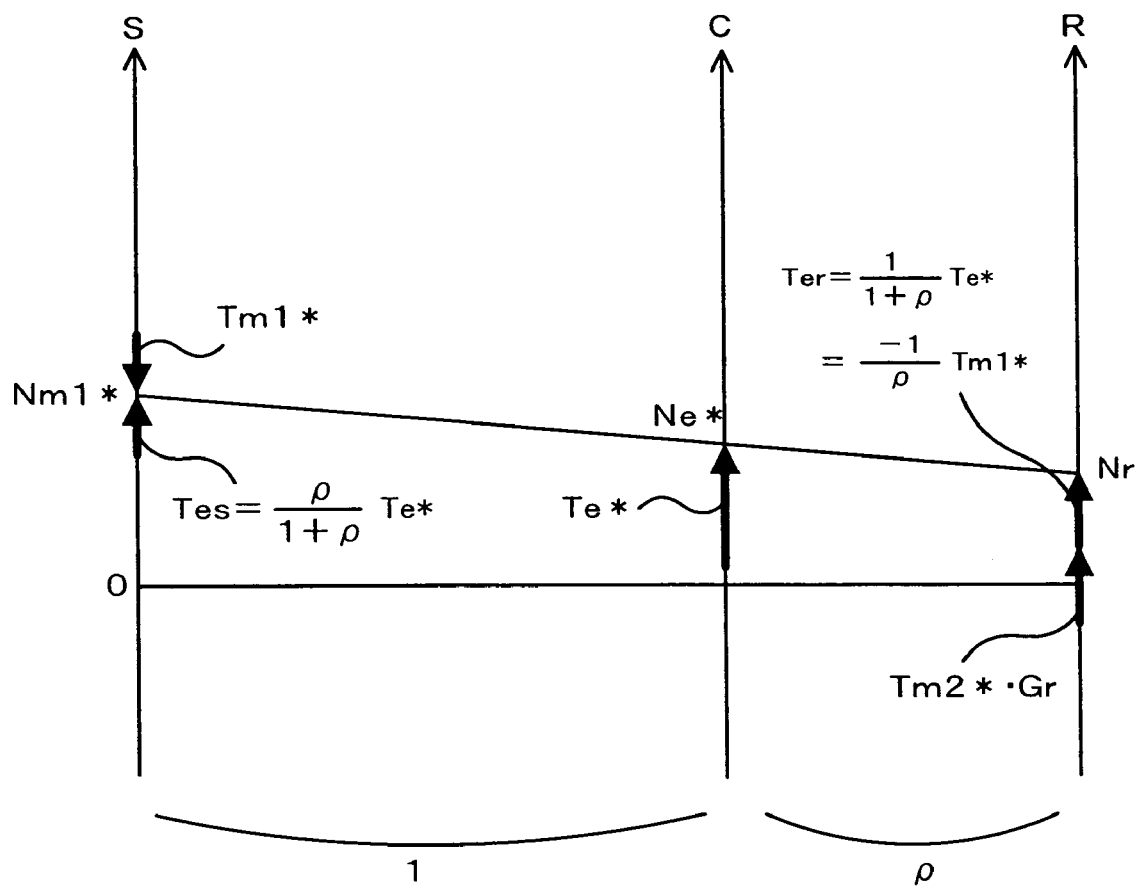
FIG. 8 shows dynamic explanation of rotation elements included in power distribution integration mechanism 30.

Equation (1) is a dynamic relational expression of the rotation elements included in the power distribution integration mechanism 30. The alignment chart of FIG. 8 shows torque-rotation speed dynamics of the rotation elements included in the power distribution integration mechanism 30. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32, which is obtained by multiplying the rotation speed Nm2 of the motor MG2 by the gear ratio Gr of the reduction gear 35. Equation (1) is readily introduced from this alignment chart of FIG. 8. Two thick arrows on the axis 'R' respectively show a torque that is transmitted to the ring gear shaft 32a when the torque Te* is output from the engine 22 in steady operation at a specific drive point of the target rotation speed Ne* and the target torque Te*, and a torque that is applied to the ring gear shaft 32a via the reduction gear 35 when a torque Tm2* is output from the motor MG2. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term.

After calculation of the target rotation speed Nm1* and the torque command Tm1* of the motor MG1, the CPU 72 calculates an upper torque restriction Tmax and a lower torque restriction Tmin as maximum and minimum torques output from the motor MG2 according to Equations (3) and (4) given below (step S250):

$$Tmax = (Wout - Tm1^* \cdot Nm1)/Nm2 \quad (3)$$

$$Tmin = (Win - Tm1^* \cdot Nm1)/Nm2 \quad (4)$$

The upper torque restriction Tmax and the lower torque restriction Tmin are respectively given by dividing a difference between the output limit Wout of the battery 50 and power consumption (power generation) of the motor MG1, which is the product of the torque command Tm1* and the input current rotation speed Nm1 of the motor MG1, and a difference between the input limit Win of the battery 50 and the power consumption of the motor MG1 by the input current rotation speed Nm2 of the motor MG2. The CPU 72 then calculates a tentative motor torque Tm2 tmp to be output from the motor MG2 from the torque demand Tr*, the torque command Tm1* of the motor MG1, the gear ratio ρ of the power distribution integration mechanism 30, and the gear ratio Gr of the reduction gear 35 according to Equation (5) given below (step S260):

$$Tm2tmp = (Tr^* + Tm1^*/\rho)/Gr \quad (5)$$

The CPU 72 limits the tentative motor torque Tm2tmp to the range between the lower torque restriction Tmin and the upper torque restriction Tmax to set a torque command Tm2* of the motor MG2 (step S270). Setting the torque command Tm2* of the motor MG2 in this manner restricts the torque demand Tr* to be output to the ring gear shaft 32a or the drive shaft within the range between the input limit Win and the output limit Wout of the battery 50. Equation (5) is readily introduced from the alignment chart of FIG. 8.

The CPU 72 sends the target rotation speed Ne* and the target torque Te* of the engine 22 to the engine ECU 24, while sending the torque commands Tm1* and Tm2* of the motors MG1 and MG2 to the motor ECU 40 (step S280), before exiting from the drive control routine. The engine ECU 24 receives the target rotation speed Ne* and the target torque Te* and executes fuel injection control and ignition control of the engine 22 to drive the engine 22 at the specific drive point of the target rotation speed Ne* and the target torque Te*. The motor ECU 40 receives the torque commands Tm1* and Tm2* and executes switching control of the switching elements included in the respective inverters 41 and 42 to drive the motor MG1 with the torque command Tm1* and the motor MG2 with the torque command Tm2*.

Figure 9:
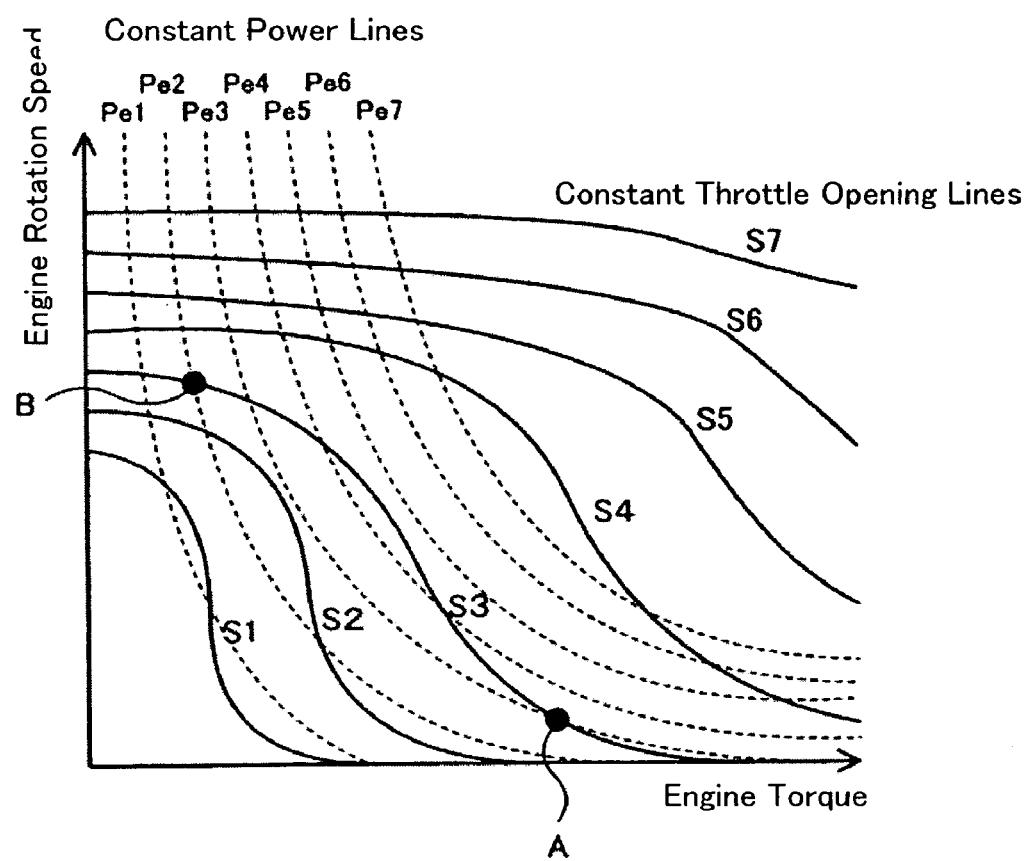
FIG. 9 shows an example of target rotation speed setting map.

The electric power difference ΔPb of higher than the preset threshold value P2 at step S150 suggests that the current output power of the engine 22 is greater than the engine power demand Pe* and that the current charge-discharge power Pb of the battery 50 exceeds the allowable range from the charge-discharge power demand Pb*. The CPU 72 accordingly sets the cold control execution flag F equal to 1 (step S180), subtracts the previous charge-discharge power demand Pb* from the sum of the current charge-discharge power Pb and the previous engine power demand Pe* to calculate the actual engine power Preal as the actual output of the engine 22 (step S190), and resets the target rotation speed Ne* of the engine 22 corresponding to the calculated actual engine power Preal and the current engine power demand Pe* (step S200). The target rotation speed Ne* of the engine 22 is reset to a certain level of the rotation speed Ne of the engine 22 that makes the actual engine power Preal substantially equal to the current engine power demand Pe* without varying the throttle opening TH. The control procedure of the first embodiment stores in advance variations in target rotation speed Ne* against the actual engine power Preal, the engine power demand Pe*, and the throttle opening TH as a target rotation speed setting map in the ROM 74 and reads the target rotation speed Ne* corresponding to the given actual engine power Preal, the given engine power demand Pe*, and the given throttle opening TH from the map. One example of the target rotation speed setting map is shown in FIG. 9. Solid line curves represent constant throttle opening lines of the throttle opening TH, and broken line curves represent constant power lines of output power Pe from the engine 22. For example, it is assumed that the engine power demand Pe* is set equal to a value Pe2 and that the engine 22 is driven with the throttle opening TH equal to a value S3. The engine 22 receives the higher-density intake air and outputs the actual engine power Preal equal to a value Pe3. In this state, the engine 22 is driven at a point A in the map of FIG. 9. The output of the engine 22 driven at a rotation speed of a point B, which is an intersection of the constant throttle opening line of the throttle opening TH fixed to the value S3 and the constant power line of the engine power Pe fixed to the value Pe2, meets the engine power demand Pe* without varying the throttle opening TH. The target rotation speed Ne* of the engine 22 is accordingly reset to the rotation speed of the point B. After resetting the target rotation speed Ne* of the engine 22, the CPU 72 instructs the engine ECU 24 to keep the current throttle opening TH (step S210), calculates the target rotation speed Nm1* and the torque command Tm1* of the motor MG1 from the reset target rotation speed Ne* according to Equations (1) and (2) given above (step S240), and sets the torque command Tm2* of the motor MG2 as described above (steps S250 to S270). The CPU 72 then sends the target rotation speed Ne* and the target torque Te* of the engine 22 to the engine ECU 24, while sending the torque commands Tm1* and Tm2* of the motors MG1 and MG2 to the motor ECU 40 (step S280), before exiting from the drive control routine. The above series of cold control causes the actual engine power Preal output from the engine 22 to be substantially equal to the engine power demand Pe* and effectively prevents the battery 50 from being charged with an unexpectedly large electric power. Such prevention restricts the state of charge (SOC) of the battery 50 to an expected level and restrains the engine 22 from being stopped undesirably. The control procedure of the first embodiment accordingly prevents frequent changeover between the stop of the engine 22 and the start of the engine 22 induced by a decrease in state of charge (SOC) of the battery 50, which is caused by a supply of electric power from the battery 50 to the auxiliary machinery during the stop of the engine 22.

When the electric power difference ΔPb is not higher than the preset threshold value P2 at step S150 and the cold control execution flag F1 is equal to 1 at step S160, the electric power difference ΔPb is compared with a preset threshold value P3 (step S220). The threshold value P3 is used as a criterion for determining whether the cold control is to be terminated, and is set equal to a negative value. The cold control raises the rotation speed of the engine 22 with the throttle opening TH kept at the current level, thus causing the actual engine power Preal output from the engine 22 to be substantially equal to the engine power demand Pe*. Sufficient warm-up of the engine 22 heats the intake air into the combustion chamber of the engine 22 and lowers the density of the intake air. The operation of the engine 22 at a higher rotation speed than the target rotation speed Ne* with the throttle opening TH kept at the current level decreases the actual engine power Preal output from the engine 22 and lowers the electric power difference ΔPb, which is equivalent to the difference between the actual engine power Preal and the engine power demand Pe*, to a negative level. The threshold value P3 is used to detect this state. The electric power difference ΔPb of higher than the preset threshold value P3 suggests the necessity of continuation of the cold control. A previous target rotation speed Ne* set in the previous cycle of this routine, that is, the target rotation speed Ne* reset at step S200 in the previous cycle, is accordingly set to the current target rotation speed Ne* of the engine 22 (step S230). The CPU 72 then instructs the engine ECU 24 to keep the current throttle opening TH (step S210) and executes the processing of and after step S240. The continued cold control effectively restrains the battery 50 from being charged with an unexpectedly large electric power, while preventing frequent changeover between the stop and the start of the engine 22.

The electric power difference ΔPb of not higher than the preset threshold value P3 at step S220, on the other hand, suggests sufficient warm-up of the engine 22 and no-necessity of continuation of the cold control. The CPU 72 accordingly sets the cold control execution flag F equal to 0 (step S170) and executes the processing of and after step S240.

In the hybrid vehicle 20 of the first embodiment described above, the cold control is executed to prevent the engine 22, which receives the higher-density intake air in a cold environment, from outputting the greater power than the engine power demand Pe* and thereby restrain the battery 50 from being charged with an unexpectedly large electric power. Such control desirably prevents frequent changeover between the stop of the engine 22 induced by an increase in state of charge (SOC) of the battery 50 above the expected level and the start of the engine 22 induced by a decrease in state of charge (SOC) of the battery 50, which is caused by a supply of electric power from the battery 50 to the auxiliary machinery during the stop of the engine 22. The hybrid vehicle 20 of this embodiment ensures output of a required level of torque corresponding to the torque demand Tr* to the ring gear shaft 32a or the drive shaft, simultaneously with execution of such cold control.

In the hybrid vehicle 20 of the first embodiment, in response to the electric power difference ΔPb of higher than the preset threshold value P2, that is, when the actual engine power Preal output from the engine 22 is greater than the engine power demand Pe*, the control procedure resets the target rotation speed Ne* of the engine 22 to make the actual engine power Preal substantially equal to the engine power demand Pe* and controls the engine 22 to be driven at the reset target rotation speed Ne* with the throttle opening TH kept at the current level. In the case where the actual engine power Preal is greater than the engine power demand Pe*, the essential requirement is to decrease the charge-discharge power Pb of the battery 50. One modified control procedure may thus reset the target rotation speed Ne* of the engine 22 to make the actual engine power Preal approach to the engine power demand Pe* and control the engine 22 to be driven at the reset target rotation speed Ne* with the throttle opening TH kept at the current level. The degree of the approach of the actual engine power Preal to the engine power demand Pe* may be set arbitrarily but is preferably within the range of the input limit Win of the battery 50. The preferable control procedure thus makes the actual engine power Preal approach to the engine power demand Pe* to ensure the charge-discharge power Pb within the input limit Win of the battery 50. In this modified procedure, the engine power demand Pe* used to reset the target rotation speed Ne* of the engine 22 at step S200 is replaced by (Pe*−Pb*+Win), which is obtained by subtracting the charge-discharge power demand Pb* from the engine power demand Pe* and adding the input limit Win of the battery 50.

Figure 10:
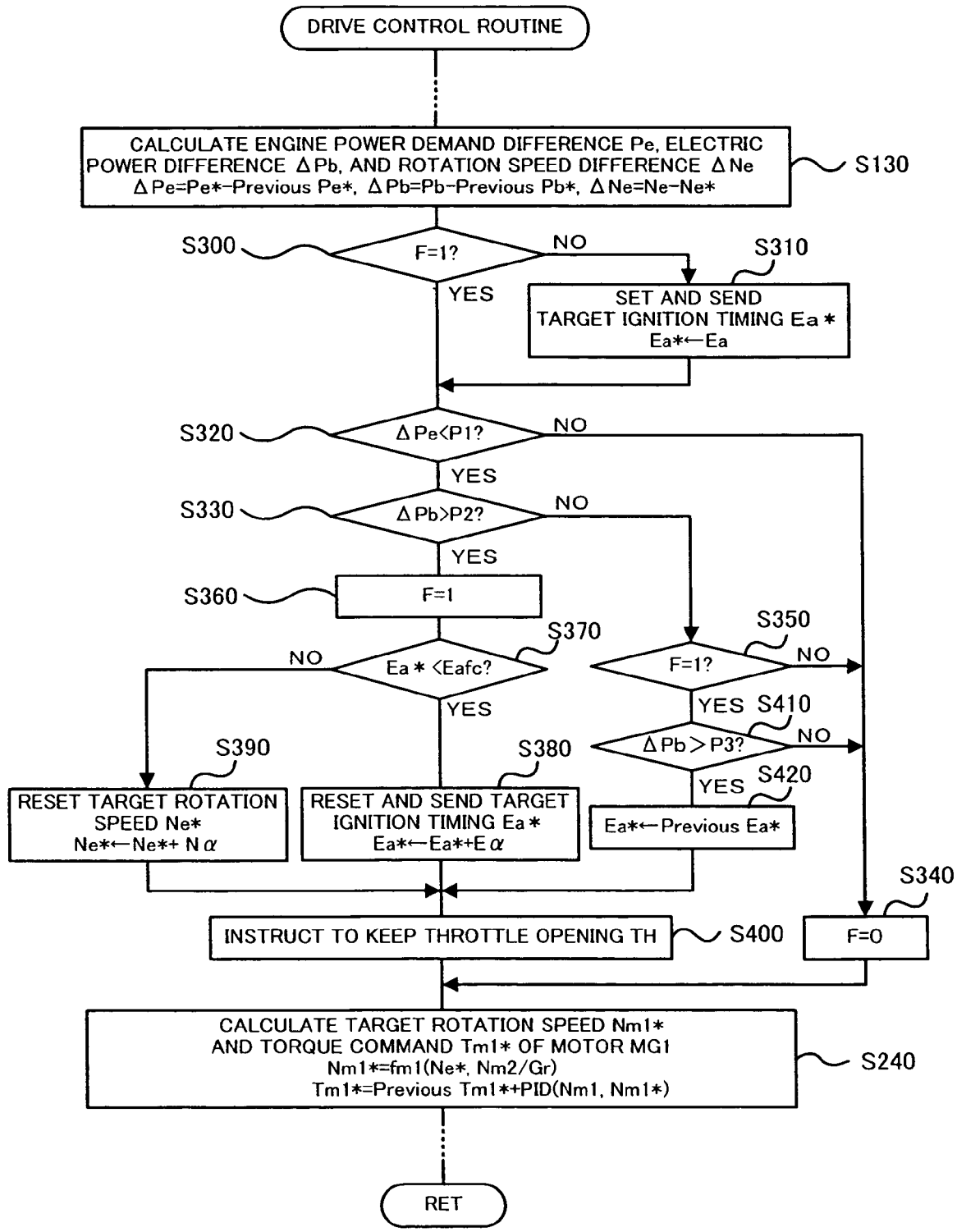
FIG. 10 is a flowchart showing a drive control routine executed by a hybrid electronic control unit 70 included in the hybrid vehicle 20B of the second embodiment.

A hybrid vehicle 20B in a second embodiment of the invention described below has the same configuration as that of the hybrid vehicle 20 of the first embodiment shown in FIG. 1. The like constituents of the hybrid vehicle 20B of the second embodiment to those of the hybrid vehicle 20 of the first embodiment are expressed by the like numerals and symbols and are neither explained nor illustrated specifically here. The only differenceis that the hybrid vehicle 20B of the second embodiment executes a drive control routine of FIG. 10, in place of the drive control routine of FIG. 5. The processing of steps S100 to S120 and the processing of steps S250 to S280 in the drive control routine of FIG. 10 are identical with those in the drive control routine of FIG. 5 and are omitted from the illustration.

In the drive control routine of the second embodiment, the CPU 72 of the hybrid electronic control unit 70 inputs the required data for control, for example, the accelerator opening Acc (step S100), sets the torque demand Tr* and the engine power demand Pe* (step S110), sets the target rotation speed Ne* and the target torque Te* of the engine 22 based on the engine power demand Pe* (step S120), and calculates the engine power demand difference ΔPe, the electric power difference ΔPb, and the rotation speed difference ΔNe (step S130). This is identical with the processing of steps S100 to S130 in the drive control routine of FIG. 5.

The CPU 72 then determines whether the cold control execution flag F is equal to 1 (step S300). In response to the cold control execution flag F equal to 0, the CPU 72 sets a selected ignition timing Ea to a target ignition timing Ea* and sends the target ignition timing Ea* to the engine ECU 24 (step S310). The control procedure of the second embodiment experimentally or otherwise specifies a variation in ignition timing Ea that enables the engine 22 to be driven at the efficient drive point of the target rotation speed Ne* and the target torque Te* and stores in advance the specified variation in ignition timing Ea as an ignition timing setting map in the ROM 74. The CPU 72 reads the ignition timing Ea corresponding to a preset target drive point defined by the target rotation speed Ne* and the target torque Te* from the ignition timing setting map at step S310. The cold control execution flag F equal to 1, on the other hand, means that the cold control discussed later has been executed in a previous cycle of this routine to reset the target ignition timing Ea*. The control flow thus skips the processing of step S310 in this condition. The cold control execution flag F is initialized to 0 in the first cycle of this routine.

The CPU 72 then executes the processing of steps S320, S330, S340, and S350, which are respectively identical with steps S140, S150, S170, and S160 in the drive control routine of FIG. 5. The CPU 72 successively compares the calculated engine power demand difference ΔPe with the preset threshold value P1 (step S320) and compares the calculated electric power difference ΔPb with the preset threshold value P2 (step S330). The engine power demand difference ΔPe of not less than the preset threshold value P1 suggests a significant change of the engine power demand Pe*. There is accordingly no need of executing cold control discussed later to change the engine power demand Pe*. The cold control execution flag F is thus set equal to 0 (step S340). In response to the engine power demand difference ΔPe of less than the preset threshold value P1 and to the electric power difference ΔPb of not higher than the preset threshold value P2, the CPU 72 determines whether the cold control execution flag F is equal to 1 (step S350). In the case where the cold control execution flag F is equal to 0, the control flow goes to step S340. Under this condition, the processing of step S340 is actually skipped since the cold control execution flag F has already been set equal to 0.

After setting the cold control execution flag F equal to 0, the CPU 72 executes the processing of steps S240 to S280, which is identical with the processing of steps S240 to S280 in the drive control routine of FIG. 5 described above. The CPU 72 calculates the target rotation speed Nm1* and the torque command Tm1* of the motor MG1 from the target rotation speed Ne* according to Equations (1) and (2) given above (step S240), and sets the torque command Tm2* of the motor MG2 (steps S250 to S270). The CPU 72 sends the target rotation speed Ne* and the target torque Te* of the engine 22 to the engine ECU 24, while sending the torque commands Tm1* and Tm2* of the motors MG1 and MG2 to the motor ECU 40 (step S280), before exiting from the drive control routine of FIG. 10. The ignition control sets the target ignition timing Ea* to an output timing of a control signal to the ignition coil 138, in response to the crank position detected by the crank position sensor 140, and accordingly enables the engine 22 to be ignited at the preset target ignition timing Ea*.

The electric power difference ΔPb of higher than the preset threshold value P2 at step S330 suggests that the current output power of the engine 22 is greater than the engine power demand Pe* and that the current charge-discharge power Pb of the battery 50 exceeds the allowable range from the charge-discharge power demand Pb*. The CPU 72 accordingly sets the cold control execution flag F equal to 1 (step S360), and compares the preset target ignition timing Ea* of the engine 22 with a flameout limit ignition timing Eafc, which represents a limit ignition timing of causing failed ignition of the engine 22 (step S370). The control procedure of the second embodiment stores in advance variations in flameout limit ignition timing Eafc against the target rotation speed Ne* of the engine 22 and the throttle opening TH as a flameout limit ignition timing setting map in the ROM 74 and reads the flameout limit ignition timing Eafc corresponding to the given target rotation speed Ne* and the given throttle opening TH from the map. When the target ignition timing Ea* of the engine 22 has an advance from the flameout limit ignition timing Eafc, a certain lag of the ignition timing Ea to lower the output torque level of the engine 22 will not cause failed ignition of the engine 22. The CPU 72 accordingly resets the target ignition timing Ea* of the engine 22 to have a lag of a preset angle Eα (for example, 5 degrees) and sends the reset target ignition timing Ea* to the engine ECU 24 (step S380). After setting the target ignition timing Ea*, the CPU 72 instructs the engine ECU 24 to keep the current throttle opening TH (step S400) and executes the processing of steps S240 to S280. The lag of the target ignition timing Ea* of the engine 22 lowers the actual output level Preal of the engine 22 (actual engine power) described in the first embodiment. The lowered actual engine power Preal thus approaches to the engine power demand Pe* and effectively prevents the battery 50 from being charged with an unexpectedly large electric power. Such prevention restricts the state of charge (SOC) of the battery 50 to an expected level and restrains the engine 22 from being stopped undesirably. The control procedure of the second embodiment accordingly prevents frequent changeover between the stop of the engine 22 and the start of the engine 22 induced by a decrease in state of charge (SOC) of the battery 50, which is caused by a supply of electric power from the battery 50 to the auxiliary machinery during the stop of the engine 22.

When the target ignition timing Ea* of the engine 22 is equal to the flameout limit ignition timing Eafc or has a lag from the flameout limit ignition timing Eafc, on the other hand, even a slight additional lag of the ignition timing Ea causes failed ignition of the engine 22. The CPU 72 accordingly resets the target rotation speed Ne* of the engine 22 with an increase of a preset additional value Nα (for example, 50 rotations per minute) (step S390), instructs the engine ECU 24 to keep the current throttle opening TH (step S400), and executes the processing of steps S240 to S280. The heightened target rotation speed Ne* of the engine 22 gives a lag to the flameout limit ignition timing Eafc. A further lag of the target ignition timing Ea* is then allowed at step S380 in a next cycle of this routine to make the actual engine power Preal of the engine 22 further approach to the engine power demand Pe*.

When the electric power difference ΔPb is not higher than the preset threshold value P2 at step S330 and the cold control execution flag F1 is equal to 1 at step S350, the electric power difference ΔPb is compared with a preset threshold value P3 (step S410). The threshold value P3 is used as a criterion for determining whether the cold control is to be terminated, and is set equal to a negative value. The cold control of the second embodiment reduces the torque level of the engine 22 with the throttle opening TH kept at the current level, thus causing the actual engine power Preal output from the engine 22 to approach to the engine power demand Pe*. Sufficient warm-up of the engine 22 lowers the density of the intake air. The operation of the engine 22 at the lagged target ignition timing Ea* with the throttle opening TH kept at the current level decreases the actual engine power Preal output from the engine 22 and lowers the electric power difference ΔPb, which is equivalent to the difference between the actual engine power Preal and the engine power demand Pe*, to a negative level. The threshold value P3 is used to detect this state. The electric power difference ΔPb of higher than the preset threshold value P3 suggests the necessity of continuation of the cold control. A previous target ignition timing Ea* set in the previous cycle of this routine, that is, the target ignition timing Ea* reset at step S380 in the previous cycle, is accordingly set to the current target ignition timing Ea* of the engine 22 (step S420). The CPU 72 then instructs the engine ECU 24 to keep the current throttle opening TH (step S400) and executes the processing of steps S240 to S280. The continued cold control effectively restrains the battery 50 from being charged with an unexpectedly large electric power, while preventing frequent changeover between the stop and the start of the engine 22.

The electric power difference ΔPb of not higher than the preset threshold value P3 at step S410, on the other hand, suggests sufficient warm-up of the engine 22 and no-necessity of continuation of the cold control. The CPU 72 accordingly sets the cold control execution flag F equal to 0 (step S340) and executes the processing of steps S240 to S280.

In the hybrid vehicle 20B of the second embodiment described above, the cold control is executed to prevent the engine 22, which receives the higher-density intake air in a cold environment, from outputting the greater power than the engine power demand Pe* and thereby restrain the battery 50 from being charged with an unexpectedly large electric power. Such control desirably prevents frequent changeover between the stop of the engine 22 induced by an increase in state of charge (SOC) of the battery 50 above the expected level and the start of the engine 22 induced by a decrease in state of charge (SOC) of the battery 50, which is caused by a supply of electric power from the battery 50 to the auxiliary machinery during the stop of the engine 22.

In the hybrid vehicle 20B of the second embodiment, in response to the electric power difference ΔPb of higher than the preset threshold value P2, that is, when the actual engine power Preal output from the engine 22 is greater than the engine power demand Pe*, the control procedure resets the target ignition timing Ea* of the engine 22 to make the actual engine power Preal approach to the engine power demand Pe* and controls the engine 22 to be ignited at the reset target ignition timing Ea* with the throttle opening TH kept at the current level. The degree of the approach of the actual engine power Preal to the engine power demand Pe* may be set arbitrarily but is preferably within the range of the input limit Win of the battery 50. The preferable control procedure thus makes the actual engine power Preal approach to the engine power demand Pe* to ensure the charge-discharge power Pb within the input limit Win of the battery 50. One possible modification may reset the target ignition timing Ea* to make the actual engine power Preal substantially equal to the engine power demand Pe*. The modification adds a step of calculating the actual engine power Preal (see step S190 in the drive control routine of FIG. 5) before step S380 of resetting the target ignition timing Ea*. The modified procedure resets the target ignition timing Ea* based on the calculated actual engine power Preal, the throttle opening TH, and the target rotation speed Ne* at step S380.

In the hybrid vehicles 20 and 20B of the first and the second embodiments, the control procedure varies the rotation speed or the ignition timing of the engine 22 to make the actual engine power Preal of the engine 22 substantially equal to or approach to the engine power demand Pe*. The rotation speed or the ignition timing of the engine 22 is, however, not the restrictive target of the control. One modified procedure controls the variable valve timing mechanism 150 to regulate the open-close timing of the intake valve 128, for example, to give a lag to the intake timing, in order to make the actual engine power Preal substantially equal to or approach to the engine power demand Pe*.

In the hybrid vehicles 20 and 20B of the first and the second embodiments, the control procedure resets the target rotation speed Ne* or the target ignition timing Ea* of the engine 22 with the throttle opening TH kept at the current level, in order to make the actual engine power Preal of the engine 22 substantially equal to or approach to the engine power demand Pe*. The throttle opening TH is, however, not the restrictive driving parameter used here. In general, the control procedure keeps one selected driving parameter among various driving parameters, which represent the operating conditions of the engine 22, for example, the rotation speed, the torque level, the ignition timing, the intake and exhaust timings, and the fuel injection flow, at the current level and varies at least one driving parameter other than the selected driving parameter.

Figure 11:
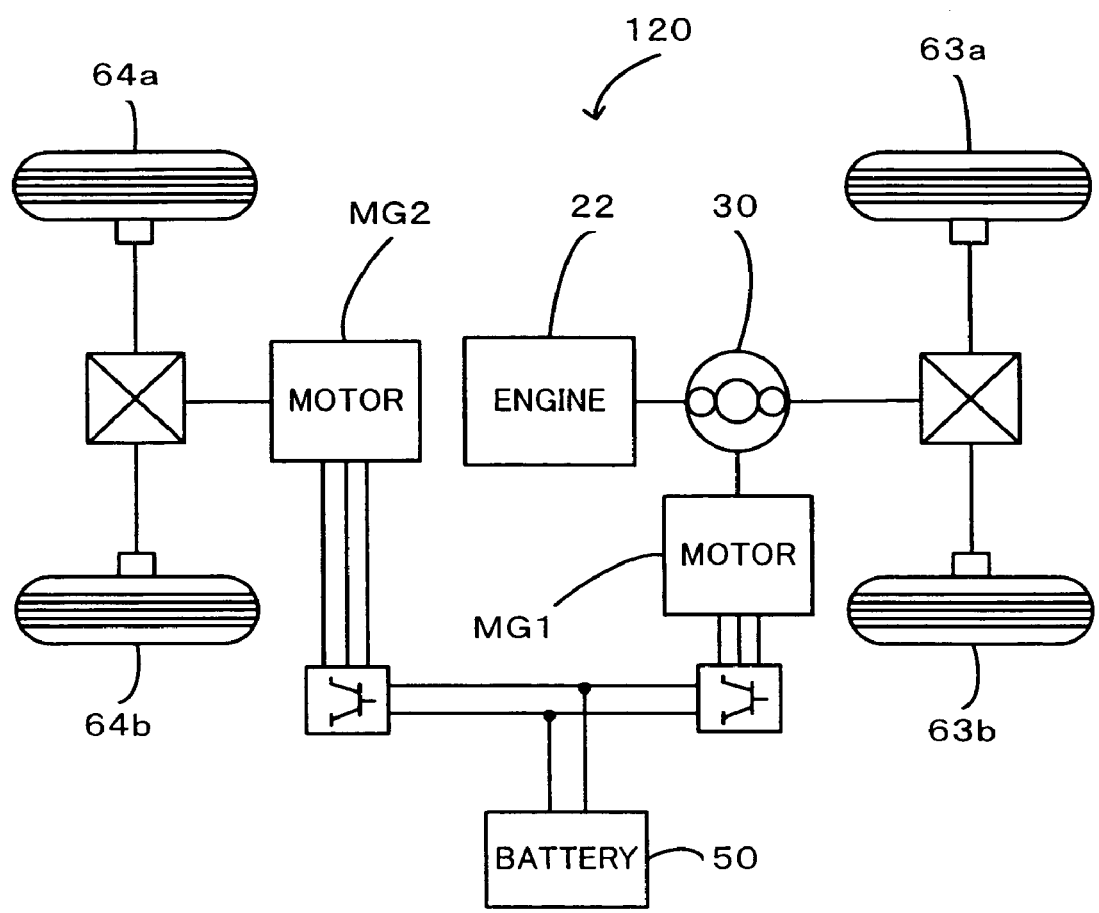
FIG. 11 schematically illustrates a hybrid vehicle 120 in one modification.
Figure 12:
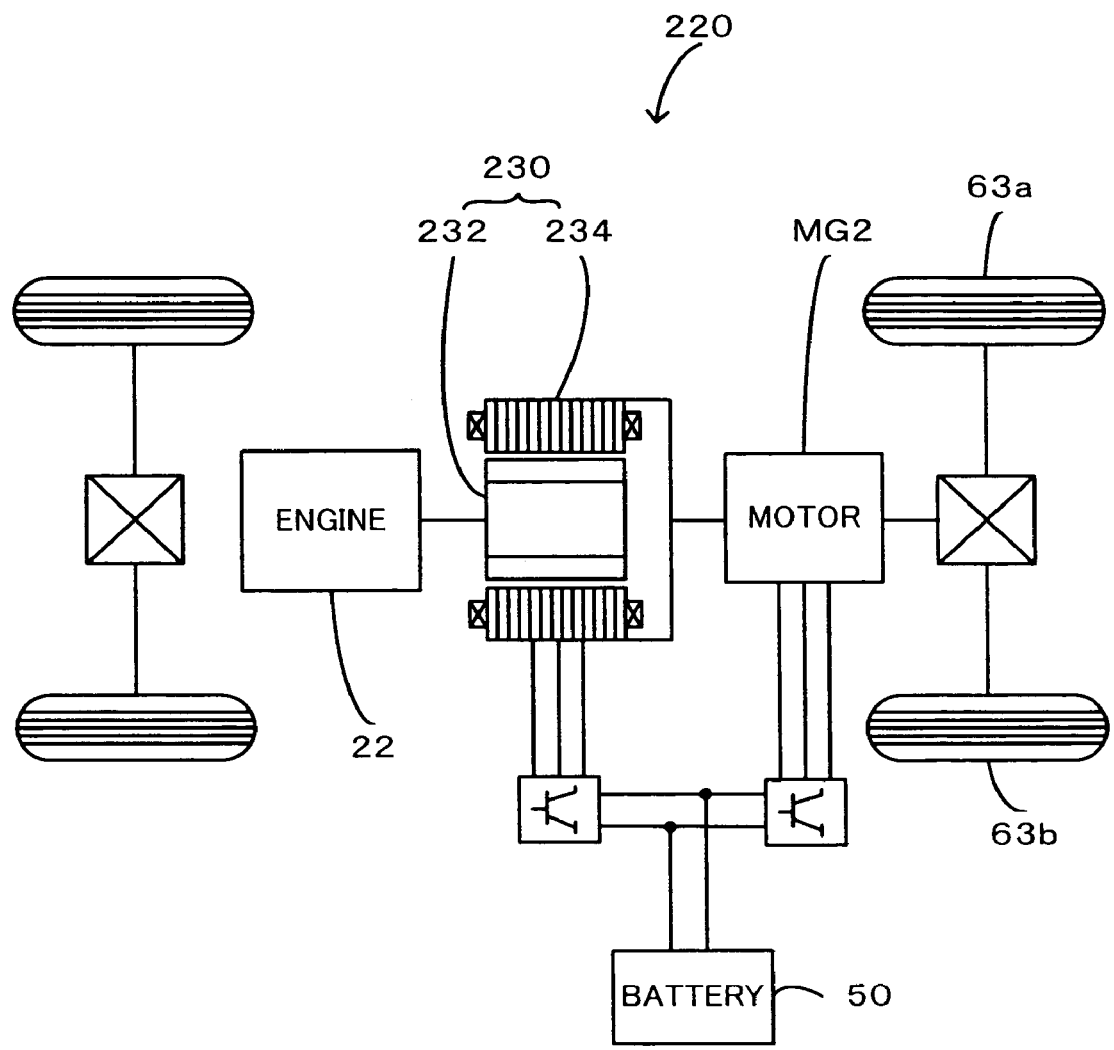
FIG. 12 schematically illustrates a hybrid vehicle 220 in another modification.

The hybrid vehicle 20 (or 20B) of the embodiment is equipped with the engine 22, the power distribution integration mechanism 30, and the two motors MG1 and MG2. This configuration is, however, not essential at all, and the principle of the invention is applicable to a hybrid vehicle of any configuration that is driven with part of the output power of the engine 22 and generates electric power to charge the battery 50. For example, the technique of the invention may be adopted in a hybrid vehicle 120 of a modified configuration as shown in FIG. 11, where the power of the motor MG2 is transmitted to a different axle (an axle linked to drive wheels 64a and 64b) from the axle connecting with the ring gear shaft 32a (the axle linked to the drive wheels 63a and 63b). The technique of the invention may also be applied to another hybrid vehicle 220 that has a pair-rotor motor 230 as shown in FIG. 12. The pair-rotor motor 230 includes an inner rotor 232 connected to the crankshaft 26 of the engine 22 and an outer rotor 234 connected to the drive shaft of outputting power to the drive wheels 63a and 63b. Part of the output power of the engine 22 is transmitted to the drive shaft, while the residual part of the engine output power is converted into electric power.

The above embodiments regard hybrid vehicles that execute a cold control. The invention is also actualized by a power output apparatus which executes the cold control, as well as a corresponding method of controlling a power output apparatus.

The above embodiments are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

What is claimed is:

1. A power output apparatus that outputs power to a drive shaft, said power output apparatus comprising:
   an internal combustion engine;
   an electric power-mechanical power input-output module that is linked to an output shaft of said internal combustion engine and to the drive shaft and outputs at least part of output power of said internal combustion engine to the drive shaft through input and output of electric powers and mechanical powers;
   an accumulator module that receives and gives electric powers from and to said electric power-mechanical power input-output module; and
   a control module that specifies a power demand to be output to the drive shaft and sets a target power to be output from said internal combustion engine in response to the specified power demand and a target drive point to attain the output of the target power,
   in an ordinary state, said control module executing ordinary control of said internal combustion engine and said electric power-mechanical power input-output module to drive said internal combustion engine at the target drive point and to ensure output of a required power corresponding to the power demand to the drive shaft,
   in a non-ordinary state where execution of the ordinary control causes an output power level of said internal combustion engine to exceed the target power, said control module executing non-ordinary control of said internal combustion engine and said electric power-mechanical power input-output module to drive said internal combustion engine at a specific drive point of making the output power level of said internal combustion engine approach to the target power, while keeping a level of a throttle opening at the target drive point, and to ensure the output of the required power corresponding to the power demand to the drive shaft.

2. A power output apparatus in accordance with claim 1, wherein said control module executes the non-ordinary control in the non-ordinary state to drive said internal combustion engine at a specific drive point of making the output power level of said internal combustion engine substantially equal to the target power.

3. A power output apparatus in accordance with claim 1, wherein said control module further sets an input limit of said accumulator module and executes the non-ordinary control in the non-ordinary state to set a drive point of said internal combustion engine for making the output power level of said internal combustion engine approach to the target power within a range of the input limit of said accumulator module and to drive said internal combustion engine at the set drive point.

4. A power output apparatus in accordance with claim 1, wherein said control module executes the non-ordinary control in the non-ordinary state to vary at least one of driving parameters, which represent operating conditions of said internal combustion engine and include a rotation speed, a torque level, an ignition timing, and intake and exhaust timings, and accordingly make the output power level of said internal combustion engine approach to the target power.

5. A power output apparatus in accordance with claim 4, wherein said control module heightens the rotation speed in the non-ordinary state than a level in the ordinary state and thereby makes the output power level of said internal combustion engine approach to the target power.

6. A power output apparatus in accordance with claim 4, wherein said internal combustion engine has an ignition timing adjustment module that adjusts the ignition timing of said internal combustion engine, and
   said control module gives a lag to the ignition timing of said internal combustion engine in the non-ordinary state and thereby makes the output power level of said internal combustion engine approach to the target power.

7. A power output apparatus in accordance with claim 4, wherein said internal combustion engine has an intake timing regulation module that regulates the intake timing into said internal combustion engine, and
   said control module gives a lag to the intake timing in the non-ordinary state and thereby makes the output power level of said internal combustion engine approach to the target power.

8. A power output apparatus in accordance with claim 1, wherein said control module specifies a target charge-discharge power to charge said accumulator module or to be discharged from said accumulator module and sets the target power based on the specified target charge-discharge power.

9. A power output apparatus in accordance with claim 1, said power output apparatus further comprising:
   a motor that is capable of outputting power to the drive shaft,
   wherein said control module controls said internal combustion engine, said electric power-mechanical power input-output module, and said motor to ensure the output of the required power corresponding to the power demand to the drive shaft.

10. A power output apparatus in accordance with claim 9, wherein said electric power-mechanical power input-output module comprises a three shaft-type power input-output unit that has three shafts, that is, the output shaft of said internal combustion engine, the drive shaft, and a rotating shaft, and determines a power input from and output to a residual shaft based on powers input from and output to any two shafts among the three shafts, and a motor that is capable of inputting and outputting power from and to the rotating shaft.

11. A power output apparatus in accordance with claim 9, wherein said electric power-mechanical power input-output module comprises a pair-rotor motor that has a first rotor connected to the output shaft of said internal combustion engine and a second rotor connected to the drive shaft, where the first rotor rotates relative to the second rotor.

12. A power output apparatus that outputs power to a drive shaft, said power output apparatus comprising:
- an internal combustion engine;
- an electric power-mechanical power input-output module that is linked to an output shaft of said internal combustion engine and to the drive shaft and outputs at least part of output power of said internal combustion engine to the drive shaft through input and output of electric powers and mechanical powers;
- an accumulator module that receives and gives electric powers from and to said electric power-mechanical power input-output module; and
- a control module that specifies a power demand to be output to the drive shaft and sets a target power to be output from said internal combustion engine in response to the specified power demand and a target drive point to attain the output of the target power,
- in an ordinary state, said control module executing ordinary control of said internal combustion engine and said electric power-mechanical power input-output module to drive said internal combustion engine at the target drive point and to ensure output of a required power corresponding to the power demand to the drive shaft,
- in a non-ordinary state where execution of the ordinary control causes an output power level of said internal combustion engine to exceed the target power, said control module executing non-ordinary control of said internal combustion engine and said electric power-mechanical power input-output module to keep a selected driving parameter among multiple driving parameters, which represent operating conditions of said internal combustion engine and include a rotation speed, a torque level, an ignition timing, intake and exhaust timings, and a throttle opening, at a current level, while varying at least one driving parameter other than the selected driving parameter, thus driving said internal combustion engine at a specific drive point of making the output power level of said internal combustion engine approach to the target power and ensuring the output of the required power corresponding to the power demand to the drive shaft.

13. A control method of a power output apparatus which includes an internal combustion engine, an electric power-mechanical power input-output module that is linked to an output shaft of said internal combustion engine and to a drive shaft and outputs at least part of output power of said internal combustion engine to the drive shaft through input and output of electric powers and mechanical powers, and an accumulator module that receives and gives electric powers from and to said electric power-mechanical power input-output module, said control method comprising the steps of:
   (a) specifying a power demand to be output to the drive shaft;
   (b) setting a target power to be output from said internal combustion engine in response to the specified power demand and a target drive point to attain the output of the target power; and
   (c) in an ordinary state, executing ordinary control of said internal combustion engine and said electric power-mechanical power input-output module to drive said internal combustion engine at the target drive point and to ensure output of a required power corresponding to the power demand to the drive shaft, while in a non-ordinary state where execution of the ordinary control causes an output power level of said internal combustion engine to exceed the target power, executing non-ordinary control of said internal combustion engine and said electric power-mechanical power input-output module to drive said internal combustion engine at a specific drive point of making the output power level of said internal combustion engine approach to the target power, while keeping a level of a throttle opening at the target drive point, and to ensure the output of the required power corresponding to the power demand to the drive shaft.

14. A control method in accordance with claim 13, wherein said step (c) executes the non-ordinary control in the non-ordinary state to drive said internal combustion engine at a specific drive point of making the output power level of said internal combustion engine substantially equal to the target power.

15. A control method in accordance with claim 13, wherein said step (c) further sets an input limit of said accumulator module and executes the non-ordinary control in the non-ordinary state to set a drive point of said internal combustion engine for making the output power level of said internal combustion engine approach to the target power within a range of the input limit of said accumulator module and to drive said internal combustion engine at the set drive point.

16. A control method in accordance with claim 13, wherein said step (c) executes the non-ordinary control in the non-ordinary state to vary at least one of driving parameters, which represent operating conditions of said internal combustion engine and include a rotation speed, a torque level, an ignition timing, and intake and exhaust timings, and accordingly make the output power level of said internal combustion engine approach to the target power.

17. A control method in accordance with claim 13, wherein said step (c) specifies a target charge-discharge power to charge said accumulator module or to be discharged from said accumulator module and sets the target power based on the specified target charge-discharge power.

18. A control method in accordance with claim 13, wherein said power output apparatus further includes a motor that is capable of outputting power to the drive shaft, and
   said step (c) controls said internal combustion engine, said electric power-mechanical power input-output module, and said motor to ensure the output of the required power corresponding to the power demand to the drive shaft.

19. A control method of a power output apparatus which includes an internal combustion engine, an electric power-mechanical power input-output module that is linked to an output shaft of said internal combustion engine and to a drive shaft and outputs at least part of output power of said internal combustion engine to the drive shaft through input and output of electric powers and mechanical powers, and an accumulator module that receives and gives electric powers from and to said electric power-mechanical power input-output module, said control method comprising the steps of:
   (a) specifying a power demand to be output to the drive shaft;
   (b) setting a target power to be output from said internal combustion engine in response to the specified power demand and a target drive point to attain the output of the target power; and
   (c) in an ordinary state, executing ordinary control of said internal combustion engine and said electric power-mechanical power input-output module to drive said internal combustion engine at the target drive point and to ensure output of a required power corresponding to the power demand to the drive shaft, while in a non-ordinary state where execution of the ordinary control causes an output power level of said internal combustion engine to exceed the target power, executing non-ordinary control of said internal combustion engine and said electric power-mechanical power input-output module to keep a selected driving parameter among multiple driving parameters, which represent operating conditions of said internal combustion engine and include a rotation speed, a torque level, an ignition timing, intake and exhaust timings, and a throttle opening, at a current level, while varying at least one driving parameter other than the selected driving parameter, thus driving said internal combustion engine at a specific drive point of making the output power level of said internal combustion engine approach to the target power and ensuring the output of the required power corresponding to the power demand to the drive shaft.

* * * * *

UNITED STATES PATENT AND TRADEMARK OFFICE
CERTIFICATE OF CORRECTION

PATENT NO. : 7,062,916 B2
APPLICATION NO. : 11/125123
DATED : June 20, 2006
INVENTOR(S) : Yusuke Kamijo et al.

It is certified that error appears in the above-identified patent and that said Letters Patent is hereby corrected as shown below:

In the Title Page, after the title:   Item 75 change the inventor Kamijo's city of residence from "Hermosa beach, CA" to --Hermosa Beach, CA--.

| Column | Line |   |
|---|---|---|
| 14 | 10 | Change "Tm2 tmp" to --Tm2tmp--. |
| 17 | 6 | Change "differenceis" to --difference is--. |

Signed and Sealed this

Thirtieth Day of October, 2007

JON W. DUDAS
*Director of the United States Patent and Trademark Office*